Feb. 13, 1934.    R. G. REED    1,946,712
NONSKID MECHANISM FOR VEHICLES
Filed June 13, 1932    2 Sheets-Sheet 1

Inventor
Robert G. Reed,
by Arthur F. Randall,
att'y.

Feb. 13, 1934.   R. G. REED   1,946,712
NONSKID MECHANISM FOR VEHICLES
Filed June 13, 1932   2 Sheets-Sheet 2
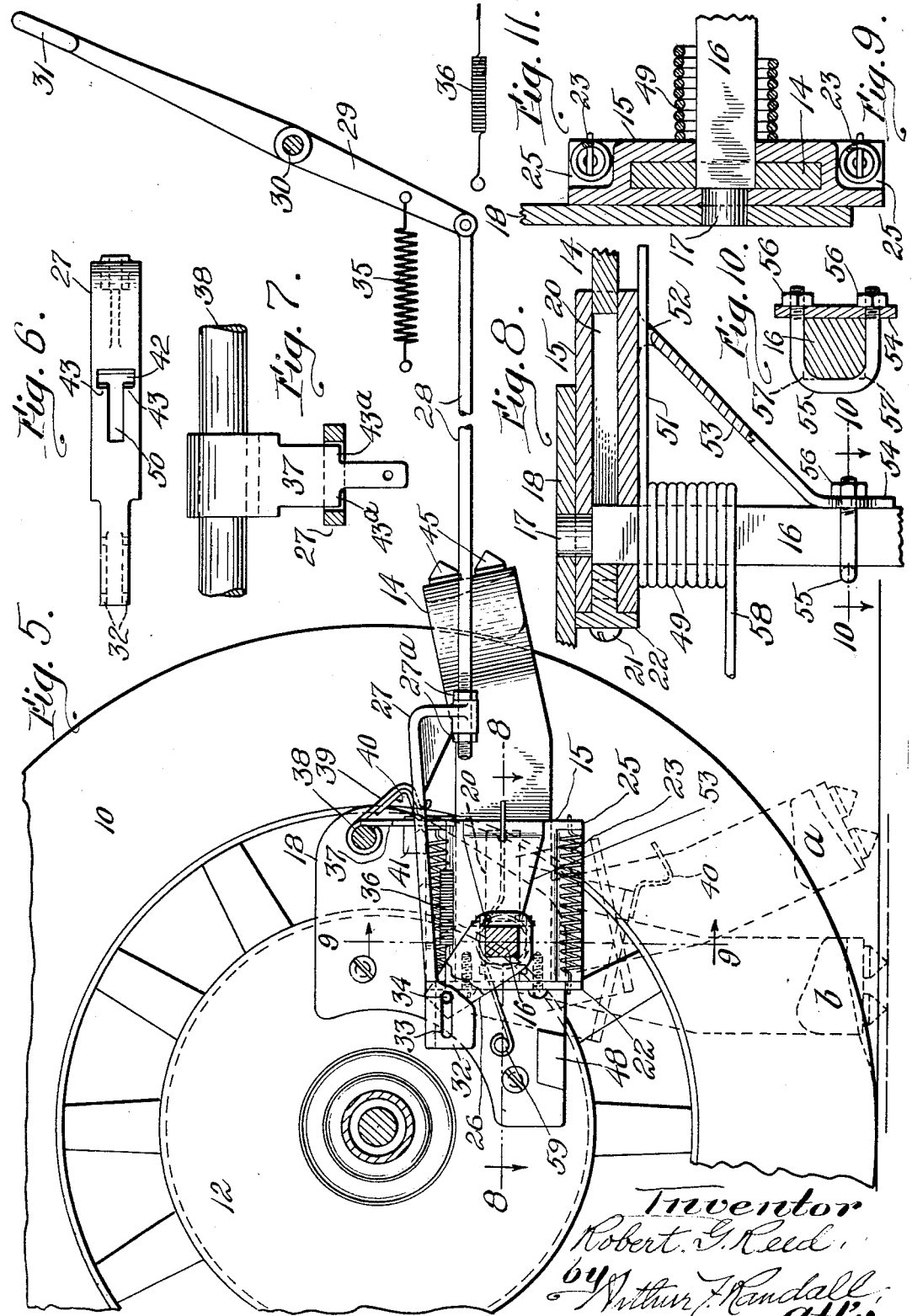

Patented Feb. 13, 1934

1,946,712

UNITED STATES PATENT OFFICE 1,946,712

NONSKID MECHANISM FOR VEHICLES

Robert G. Reed, Dorchester, Mass.

Application June 13, 1932. Serial No. 617,002

7 Claims. (Cl. 188—4)

My invention relates to non-skid mechanisms for vehicles, particularly automobiles, and it has for its object to provide simple and efficient means, under the control of the driver of the vehicle, by which forward and sidewise skidding movement of the vehicle can be immediately prevented at the will of the driver.

To these ends I have provided an improved nonskid mechanism of the character described having the features of construction and mode of operation set forth in the following description, the several novel features of the invention being particularly pointed out and defined in the claims at the close thereof.

In the preferred embodiment of my invention I have provided a brake member for each rear wheel of the vehicle, said member being pivotally supported on the frame of the vehicle in proximity to its wheel and constructed with a shoe to cooperate with the tire of the vehicle and with the ground.

The brake member is normally supported in an elevated inoperative position and is manually operable so that it can be swung downwardly into engagement with the ground or roadway with its shoe portion interposed between the tire of the wheel and the ground, the ground engaging portion of said shoe being preferably constructed with calks, or otherwise, so that it will not slide on the ground.

Also, in the best form of my invention, the brake member is normally held elevated by a spring and a latch, and associated therewith is manually controlled means through which the brake member is swung downwardly into position between the tire and the ground, said means serving, when manually operated, to first disconnect the latch from said brake member and thereafter to swing said member downwardly into its operative position.

Other features of my invention are hereinafter described.

In the accompanying drawings:

Figure 5 is a section on line 5—5 of Figure 1, but with the addition of the control lever, hereinafter described, which is disposed within reach of the driver of the vehicle.

Figures 6 and 7 are details relating to operating devices for the brake member and the latch, hereinafter described.

Figure 8 is a section on line 8—8 of Figure 5.

Figure 9 is a section on line 9—9 of Figure 5.

Figure 10 is a section on line 10—10 of Figure 8.

Figure 11 is a detail of one of the springs hereinafter described.

Figures 1, 2, 3, 4:
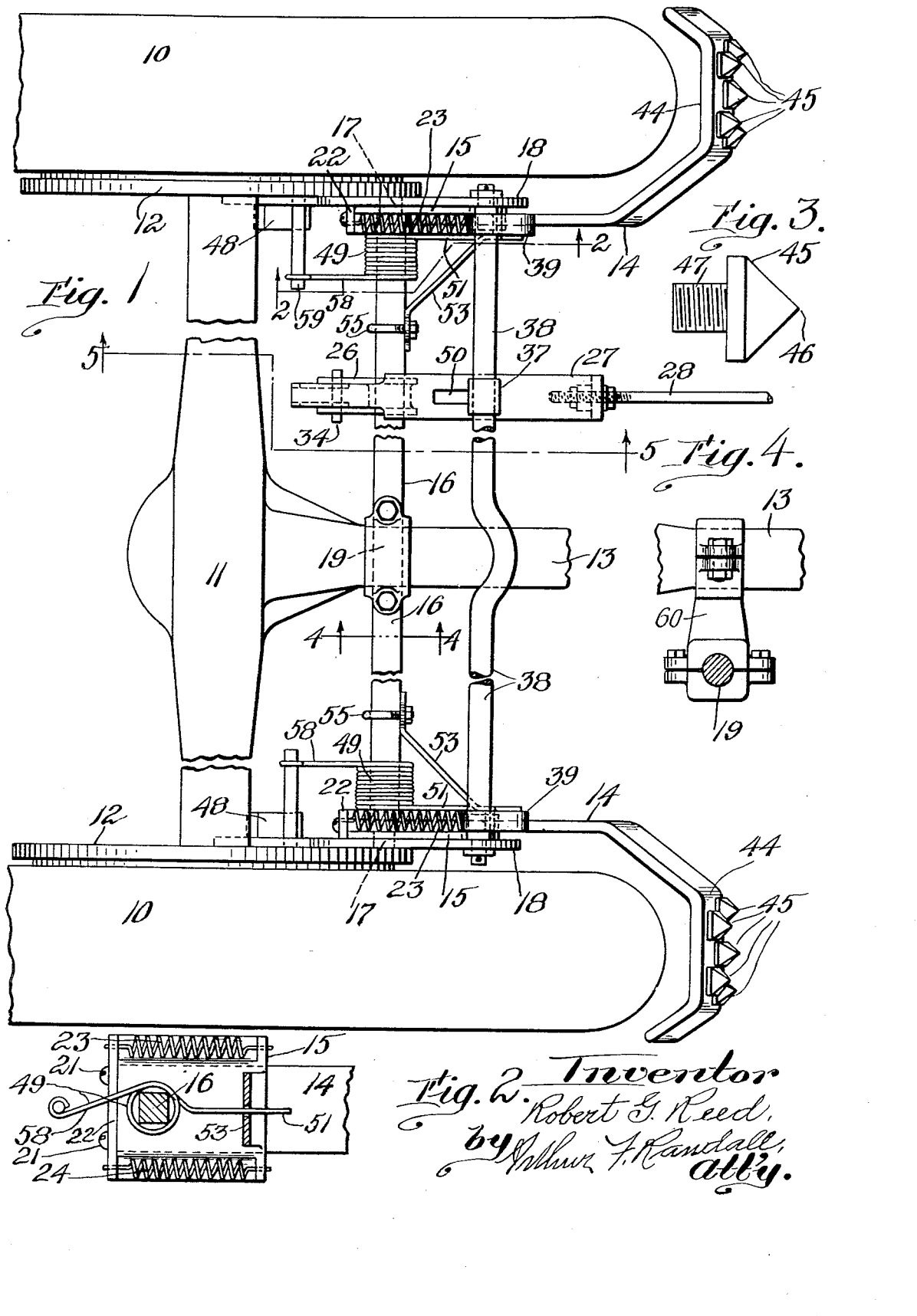
Figure 1 is a top plan view of a nonskid mechanism embodying my invention, the same being shown as associated with the two rear driving wheels of an automobile.
Figure 2 is a sectional detail on line 2—2 of Figure 1.
Figure 3 is a side elevation of one of the calks hereinafter described.
Figure 4 is a section on line 4—4 of Figure 1.

In the accompanying drawings 10, 10 represent the two rear driving wheels of an automobile; 11 is the rear axle housing provided at each end with a closure disc 12 for the brake drum of the adjacent wheel, and 13 is the propeller shaft housing. All of these parts are constructed and associated as usual.

Each wheel 10 has associated with it a nonskid brake member 14 consisting of a steel bar having one end portion slidably mounted within a rectangular sleeve 15 and having its opposite end portion bowed laterally to provide a ground and tire engaging shoe 44.

The rectangular sleeve 15 is removably fixed in position upon a shaft 16 provided at its opposite ends with trunnions 17 journaled in bearings provided in brackets 18 which are parts of, or fixed to, the flanges 12 of the rear axle housing. Thus the brackets 18 support the shaft 16 in a fixed position but so that it can rotate or rock.

With the exception of the trunnions 17 and a middle portion 19, Fig. 14, the shaft 16 is square in cross section and within the sleeve 15 the brake member 14 is made with a longitudinal slot 20 which is of approximately the same width as shaft 16 so that member 14 can slide endwise relatively thereto, but is held against swinging movement with relation thereto.

At its inner end the brake member 14 has fastened to it, as by means of screws 21, Fig. 2, an abutment plate 22 adapted to engage the adjacent end of sleeve 15 to limit the outward movement of the brake member, Figs. 1 and 5.

The brake member 14 is normally held at the limit of its outward movement with stop plate 22 against sleeve 15, by two coiled springs 23 and 24 disposed at opposite sides of sleeve 15, and whose opposite ends are fastened, respectively, to stop plate 22 and lugs 25 on slide 15.

Rigidly fixed to shaft 16, as by welding is a bifurcated arm 26 and between the branches of this arm is disposed one end of a pull-rod section 27. This pull-rod section 27 has a depending forward end portion made with a horizontally threaded aperture into which is screwed one end of a bar section 28. The two sections 27—28 constitute a pull-rod whose forward end is pivotally connected with one arm of a lever 29 that is fulcrumed at 30 on the body of the vehicle. At its upper end the lever 29 is provided with a handle 31 that is within reach of the driver of the vehicle.

The rear end of the pull-rod section 27 is made with two depending lugs 32 formed with longitudinal slots 33 that are occupied by a cross bar or pin 34 carried by the arm 26. A spring 35, Fig. 5, yieldingly holds the pull rod 27—28 at the limit of its rearward movement with the forward ends of the slots 33 against the cross bar or pin 34. One end of this spring 35 is connected with lever 29 and the other end thereof is fixed to the body of the vehicle.

The cross bar or pin 34 of arm 26 has connected to it one end of a spring 36 whose opposite end is fastened to an arm 37 that extends downwardly from and is a rigid part of a rock shaft 38, Figs. 1 and 5. Rock shaft 38 is journaled at its ends in bearings provided in brackets 18 and is constructed with two latch hooks or arms 39, one near each sleeve 15. Each sleeve 15 is made with an abutment bracket 40 to co-operate with the adjacent latch arm 39 and normally the latter is in engagement with said abutment bracket so that the brake member 14 is positively locked in its elevated inoperative position where its sleeve 15 rests against a stop lug 41 provided on the adjacent bracket 18. Thus brake member 14 is normally held against vibrating vertically on the axis of the shaft 16.

The depending arm 37 of rock shaft 38 extends through a slot 42, Figs. 6 and 7, formed in pull-rod section 27 and when the pull-rod 27—28 is drawn forward by means of lever 29, a pair of shoulders 43 provided on section 27 within the slot 42, engage the upper wider portion of the depending arm 37, Fig. 7, and swings the latter forwardly, thus raising the latch arm 39 out of engagement with the abutment bracket 40 before the rear ends of the slots 33, Fig. 5, engage the cross bar or pin 34 of the arm 26.

Continued forward movement of the pull-rod 27—28 after latch arm 39 is disengaged from abutment bracket 40 as described causes the rear ends of the slots 33 to act through the cross bar or pin 34 of arm 26 to swing the latter forwardly. This turns shaft 16 in a direction to swing the brake member 14 downwardly on to the ground or roadway as shown at $a$, Fig. 5.

When the brake shoe member 14 is brought into engagement with the ground as at $a$, and the vehicle is moving forward, the tire of the wheel rides up on to the shoe 44 of the member 14 thus causing said member to occupy the position indicated by dotted lines at $b$ where the weight of the wheel is imposed upon its shoe 44 with the result that the member 14 will not only arrest the forward movement of the vehicle, but also hold it against skidding sidewise.

Upon its bottom side the shoe 44 of the brake member 14 is provided with a plurality of pointed calks 45 of hardened steel. As shown in Fig. 3 the ground-engaging outer end of each calk is of pyramidal shape and terminates in a sharp point 46. These calks are preferably case hardened or oil hardened so as to withstand the hard usage to which they are subjected. Each calk is preferably made with a threaded shank 47 that is screwed into a threaded aperture provided through the brake shoe portion 44 of member 14 after which the inner ends of said threaded shanks may be upset to lock them against accidental displacement. As will be clear, these calks can be removed and new ones substituted when necessary because of wear or for other reasons.

As the brake member 14 arrives at the position indicated by the dotted lines at $b$, during its downward movement, its sleeve 15 is brought to bear against a stop lug 48 provided on bracket 18 which prevents further rearward movement of the brake member relatively to the wheel.

When it is desired to restore the brake member 14 to its normal elevated position, the vehicle is backed off from the shoe 44 of the brake member, whereupon a coiled spring 49, Figs. 1 and 2, swings the sleeve 15 forwardly and upwardly into a position where it bears against the stop lug 41, Fig. 5.

If the free end of the latch arm 39 occupies a position in the path of the abutment bracket 40 when the brake shoe member 14 is thus elevated by spring 49, it will be cammed aside by the upper beveled portion of abutment bracket 40 and as soon as the latter passes the hook of said latch arm the spring 35 will act through the pull-bar 27—28, arm 37 and rock shaft 38 to swing the latch arm 39 downwardly into locking engagement with the abutment bracket 40.

The slot 42, Fig. 6, has its forward end portion made relatively wide and this relatively wide portion communicates with a relatively narrow rear end portion 50 which provides the shoulders 43. The upper portion of the arm 37, Figs. 5 and 7, is made of sufficient width to co-operate with the shoulders 43 while the free end portion of said arm that is below pull-rod section 27 when arm 37 occupies its normal position, is made narrower and of a width to enter the narrow rear end portion 50 of slot 42.

It will thus be clear that when pull-rod 27—28 is drawn forward the relatively wide upper portion of arm 37 will drag over the shoulders 43 as latch 39 is swung upwardly, until the shoulders 43a thereof rest upon the top of the section 27. Continued forward movement of the pull-rod 27—28 causes the relatively narrow free end portion of arm 37 to trail along the narrow rear end portion 50, Fig. 6, of slot 42.

This construction ensures the lifting of the latch 39 at the start of the forward movement of pull-rod 27—28 and while the lost motion at the slots 33 is being taken up, so that when the rear ends of the latter engage the cross bar or pin 34 of arm 26, the latch arm 39 will be out of engagement with the abutment bracket 40.

Also, this construction delays the descent of the latch arms 39 until after the brake member 14 has completed or nearly completed its movement from the position indicated at $b$ to its normal elevated position.

Each spring 49 comprises a helical coil surrounding the shaft 16 closely adjacent to its sleeve 15, and at one end thereof the wire of said spring is extended laterally to provide an arm or end portion 51 which extends through a hole 52 provided in a brace or strut 53 integrally connected at one end with the sleeve 15. At its opposite end the strut 53 is made with an apertured foot 54 to seat against one side of the shaft 16 to which it is fastened by means of a staple bolt 55 extending around said shaft and provided with nuts 56 by means of which the foot 54 is clamped rigidly to the shaft 16. The shaft 16 has two of its corners notched or cut away as at 57, Fig. 10, to interlock with the staple bolt 55 so that the latter cannot be displaced longitudinally of shaft 16.

At its opposite end the wire of spring 49 is extended laterally to provide another arm 58 that is fastened near its outer end to a stud or post 59 projecting from the bracket 18. The spring 49 is incorporated in the structure under tension so that it tends to yieldingly hold the brake member 14 in its uppermost position against stop 41.

It will be clear from the above that the slots 33, Fig. 5, delay the downward swing of the brake member 14 until after the latch arms 39 are disengaged from the abutment bracket 40, and it will also be clear that the particular construction of pull-rod section 27 and arm 37 is employed, not only to effect the lifting movement of latch arms 39 at the start of forward movement of pull-rod 27—28, but also to delay the return of latch arms 39 to their lowermost positions again until the brake member 14, during its upward movement, nears or reaches its uppermost position.

In the event that either spring 49 is broken and renewal is necessary the brackets 18 may be removed from the housing flanges 12 after which the brackets may be removed from the ends of shafts 16 and 38. Then after removing the staple bolts 55 the sleeve 15 can be withdrawn from the shaft 16 carrying with it the spring 49. After substituting a new spring the parts may be quickly reassembled and installed within the vehicle.

The round portion 19 of the shaft 16 at the middle thereof, Figs. 1 and 4, is journalled within a bearing provided at the lower end of a bracket 60 whose upper end is clamped rigidly to the housing 13 of the propeller shaft. This bracket 60 serves to steady and support the intermediate portion of the shaft 16.

As shown in Figure 1 the rock shaft 38 is bowed upwardly over housing 13 adjacent to its middle so that it extends around said housing.

From the above description it will be clear that when the brake members 14—15 are swung downwardly into position between the tires and the ground the mechanism will function to brake the vehicle and to prevent skidding regardless of the condition of air pressure within the tire. That is, when the slide bars 14 are in their lowermost positions they are free to yield vertically to fit themselves to the ground and also to fit themselves to the tire. It will also be clear that the position of the shaft 16 in advance of the axle housing results in a movement of the tread portions 44 on an arcuate path in front of the tires of the wheels.

The treads 44 of the slide bars 14 are preferably made at their outer ends with laterally bent flanges or flaps which occupy positions upon the outer sides of the tires when the slide bars are in engagement with the ground thereby holding the tire against outward displacement relatively to said parts 44.

What I claim is:

1. A vehicle provided with supporting wheels and having a nonskid mechanism comprising a ground-engaging brake member pivotally mounted on a fixed part of the vehicle and adapted to be swung up and down on an arcuate path that is in advance of its pivot; means for positively locking said member in an elevated inoperative position; manually actuated control mechanism operable to first adjust said locking means on said fixed part to free said member and thereafter to swing the latter downwardly into engagement with the ground.

2. A vehicle provided with supporting wheels and having a nonskid mechanism comprising a ground-engaging brake member pivotally mounted on a fixed part of the vehicle and adapted to be swung up and down on an arcuate path that is in advance of its pivot; a spring yieldingly urging said member toward its uppermost inoperative position; means movably supported by said fixed part for positively locking said member stationary in its elevated inoperative position; manually actuated control mechanism operable to first adjust said locking means on said fixed part to free said member and thereafter to swing the latter downwardly in opposition to said spring into engagement with the ground.

3. A vehicle provided with supporting wheels and having a non-skid mechanism comprising a brake member including a ground-engaging slide bar and a supporting sleeve for said slide bar within which the latter is slidably mounted; a stop on said slide bar for engaging said sleeve to limit the movement of said bar in one direction; a spring for yieldingly holding said slide bar at the limit of its movement in said direction with said stop against said sleeve; means pivotally supporting said sleeve on a fixed part of the vehicle so that said slide bar is movable up and down on an arcuate path that is in advance of said pivot; means normally locking said sleeve in a position to support said slide bar in an elevated inoperative position; manually actuated control mechanism operable to first adjust said locking means to free said sleeve and thereafter to turn said sleeve in a direction to swing said slide bar downwardly into engagement with the ground, said slide bar being yieldingly held in engagement with the ground by said spring, and a stop on a fixed part of the vehicle for limiting the swinging movement of said slide bar toward its operative ground-engaging position.

4. A vehicle provided with supporting wheels and having a non-skid mechanism comprising a brake member including a ground-engaging slide bar disposed alongside of one of the wheels of the vehicle and having at one end thereof a laterally extending tread portion to co-operate with the ground and the tire of said wheel and a supporting sleeve for said slide bar within which the latter is slidably mounted; a stop on said slide bar for engaging said sleeve to limit the movement of said bar in one direction; a spring for yieldingly holding said slide bar at the limit of its movement in said direction with said stop against said sleeve; means pivotally supporting said sleeve on a fixed part of the vehicle so that said tread portion is movable up and down on an arcuate path in front of said tire; means normally locking said sleeve in position to support said slide bar in an elevated inoperative position; a manually actuated control element operable to first adjust said locking means to free said sleeve and thereafter to turn said sleeve in a direction to swing said slide bar downwardly into a position where said tread portion is between said tire and the ground, said slide bar being yieldingly held in engagement with the ground by said spring and the pressure imposed upon said tread portion by said wheel, and a stop on a fixed part of the vehicle for limiting the swinging movement of said slide bar toward its operative ground-engaging position.

5. A vehicle constructed in accordance with claim 4, and wherein said non-skid mechanism also comprises a second stop on a fixed part of the vehicle for limiting the upward swinging movement of said slide bar.

6. In a motor propelled vehicle the combination with, the two driving wheels thereof and the fixed housing for the axles of said wheels, of a non-skid mechanism comprising a horizontal shaft between said wheels that is rotatably supported adjacent to its opposite ends by said housing; a pair of sleeves removably fixed on said shaft, one near each end thereof; two ground-engaging slide bars each slidably mounted in one of said sleeves and having a laterally extending tread portion to cooperate with the tire of the adjacent wheel and with the ground; a spring connecting each sleeve with its slide bar so that the latter is yieldingly held at the limit of its movement in one direction relatively to said sleeve; stops on said housing for limiting rotary movement of said shaft in either direction; a spring for yieldingly rotating said shaft in one direction thereby to normally maintain said ground-engaging slide bars in elevated inoperative positions; a latch for positively holding said shaft against rotation in the opposite direction, and manually actuated control mechanism operable to first adjust said latch to free said shaft and thereafter to rotate the latter in a direction to swing said slide bars downwardly into positions where their tread portions are between the tires of said wheels and the ground.

7. A motor propelled vehicle, constructed in accordance with claim 6, wherein said tread portions are provided upon their bottom sides each with a plurality of pointed hardened steel calks.

ROBERT G. REED.